A. Brady,
Vault Cover,
Nº 11,018. Patented June 6, 1854.
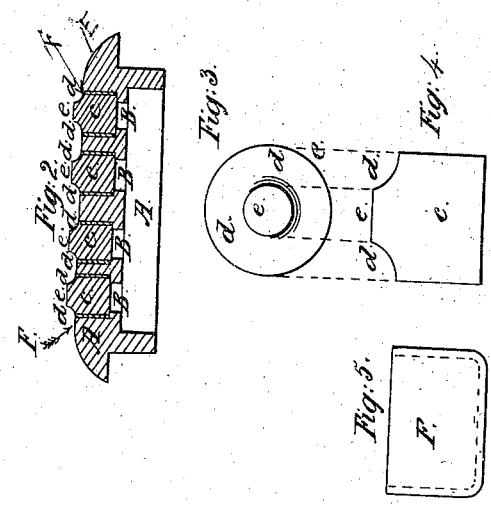
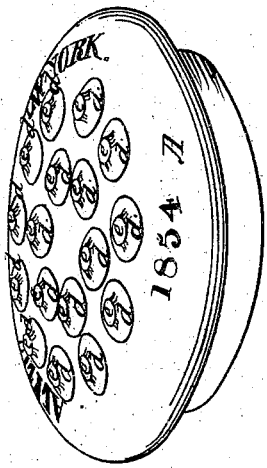

UNITED STATES PATENT OFFICE.

ALFRED BRADY, OF NEW YORK, N. Y.

VAULT-COVER.

Specification of Letters Patent No. 11,018, dated June 6, 1854.

*To all whom it may concern:*

Be it known that I, ALFRED BRADY, of the city, county, and State of New York, have invented a new and Improved Vault-Cover and which may be used for other purposes; and I do hereby declare the following to be a full and clear description of the same.

The nature of my invention consists in first making the upper and exposed surfaces of the glasses or lenses so as to be elevated above the surface of the vault cover, and having the edges hollowed out, so as to leave a button shaped center in the top of the lenses. The object of making the crown of the lenses of this shape is to prevent their being scratched, by the constant attrition of the foot passengers or from other causes, as would be the case, if they were made with flat surfaces, and consequently render the lenses, for the object sought, (that is transmitting light) useless.

The second point of my invention is the mode of setting the lenses, by means of a collar of india rubber or other water proof elastic substance. This is done by melting the india rubber, and when in a fluid state pouring it into the space between the sides of the lenses and socket in which they are placed in the vault cover, or by making india rubber collars to surround the sides of the lenses and then forcing them into the socket in the vault cover. The object of setting the lenses with india rubber packing will be obvious, when it is understood that the constant concussion they are subjected to by the heel of foot passengers—by rolling boxes and other articles over them from stores—and by various other causes in large cities, must cause them to split and break when confined by an unyielding substance like metal, and besides these causes, the expansion and contraction of metal when combined with glass and subjected to the changes of temperature in the summer time by the showers of rain that frequently fall, cause the glass to split and work loose in their sockets. The use of india rubber packing will obviate all these objections. But to describe my invention more particularly I will refer to the accompanying drawings, forming a part of this schedule, the same letters of reference wherever they occur referring to the same parts.

Figure 1 is a perspective view of the vault cover, showing the upper face of the lenses. Fig. 2 is a cut section of the vault cover, showing in section the lenses, packing and socket, in which the lenses are inserted. Figs. 3 and 4 are plan and side views of one of the lenses. Fig. 5 is a detached view of the india rubber packing for the lenses.

Letter A, is the vault cover. This is made of iron or wood as may be required.

B are a series of socket holes through the face of the vault cover. In these holes are placed the cylindrical glass lenses C. The upper face of these lenses have their edges curved out as shown at $d$, $d$, (Fig. 4,) so as to leave the crown or center ($e$) elevated above the surrounding surface of the lens, and vault cover. By this means the curved surfaces ($d$, $d$) are protected from being scratched, and the light freely admitted to the room below.

Letter F, is the india rubber packing. This packing is made like a collar to surround the lens, and is either made in that shape before the lens is inserted in its socket, or is poured in the interstices between the sides of the lens and the socket when in a solvent state, and then allowed to cool. It is preferred, however, to make them in collar form from cured india rubber as best adapted to resist the action of the sun when exposed to it.

Having now described my invention I will proceed to state what I claim and desire to secure by Letters Patent of the United States.

What I claim is—

The cylindrical lens, having its upper face formed in the manner hereinbefore set forth in combination with the india rubber, or other elastic water proof packing, and vault cover, whether made of wood or metal, substantially in form and manner of construction and for the purposes hereinbefore described.

ALFRED BRADY.

Witnesses:
CHARLES L. BARRITT,
ROBT. S. ROWLEY.